June 20, 1967 W. R. REMLEY 3,327,063
TRANSMISSION OF INFORMATION IN POWER-CODED BIPOLAR WAVEFORMS
Filed Jan. 14, 1966 3 Sheets-Sheet 1
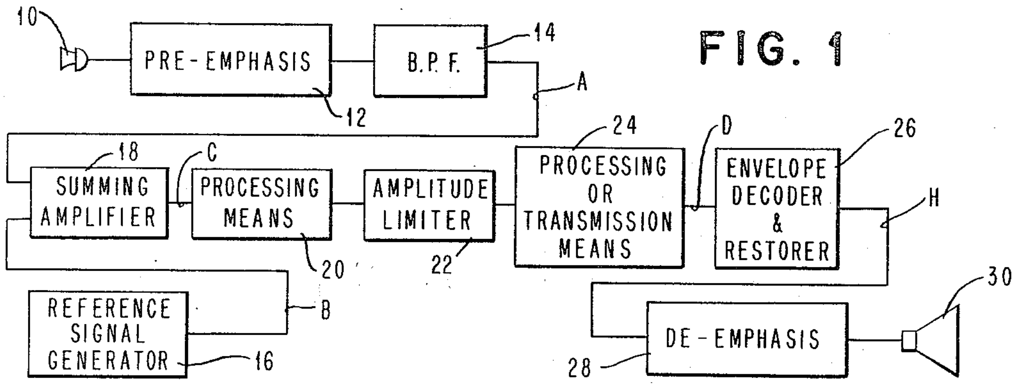
FIG. 1
FIG. 2
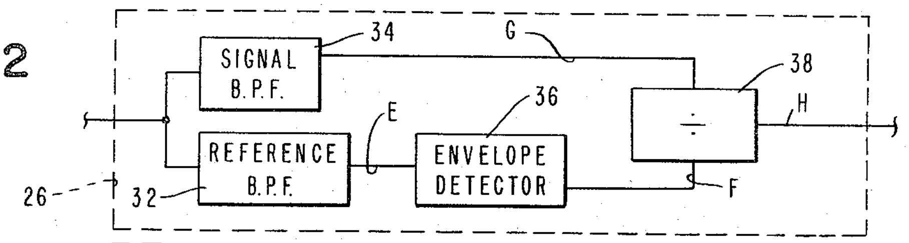
FIG. 3
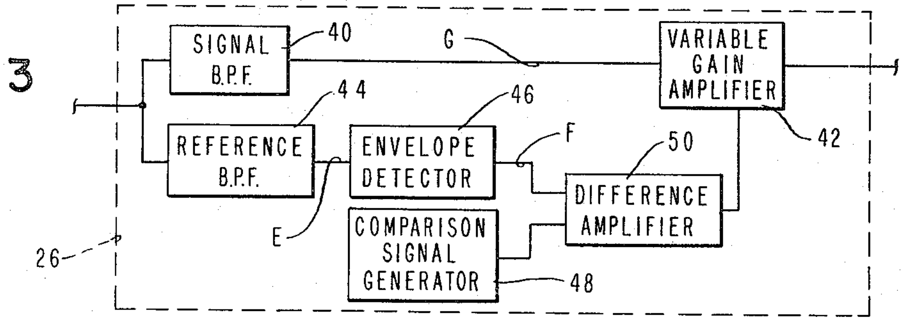
FIG. 4
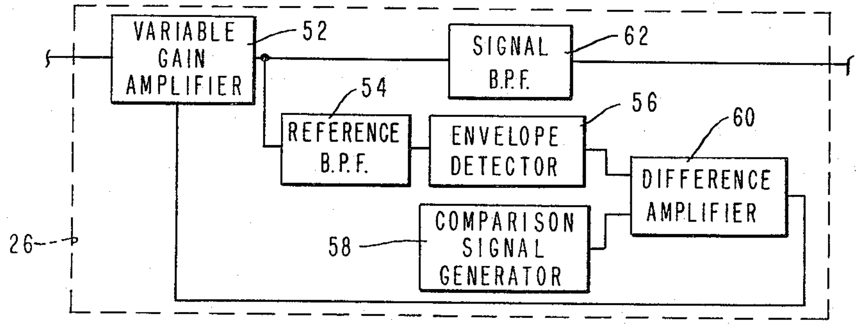
FIG. 5a FIG. 5b FIG. 5c
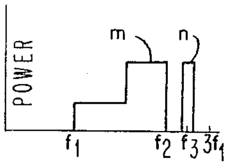
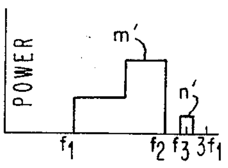
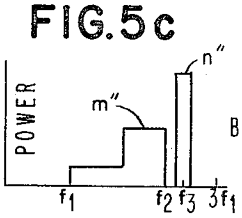
INVENTOR
WINSLOW R. REMLEY
BY
J. Janini Jr.
ATTORNEY June 20, 1967 W. R. REMLEY 3,327,063

TRANSMISSION OF INFORMATION IN POWER-CODED BIPOLAR WAVEFORMS

Filed Jan. 14, 1966 3 Sheets-Sheet 3

United States Patent Office 3,327,063

Patented June 20, 1967

3,327,063

TRANSMISSION OF INFORMATION IN POWER-CODED BIPOLAR WAVEFORMS

Winslow R. Remley, Bethesda, Md., assignor to International Business Machines Corporation, Armonk, N.Y., a corporation of New York Filed Jan. 14, 1966, Ser. No. 532,028
10 Claims. (Cl. 179—15.55)

The invention relates to transmission of information-bearing waves, such as speech waves. This patent is a continuation-in-part of now abandoned previously copending U.S. patent application, Ser. No. 265,890, filed on Mar. 18, 1963, for "Wave Transmission System."

In voice communications it is desirable to provide a transmission system for information-bearing waves which reduces the vulnerability of such waves to noise and interference, and in which the frequency band required for transmission may be reduced.

In general, this may be accomplished by the digitizing, transmission, and the analog reconstruction of the speech wave. Prior approaches to this problem may generally be grouped into two categories: (1) parametric compression, and (2) compression by limiting or clipping.

In parametric compression systems the input speech signal is analyzed to derive primary speech control parameters. These parameters are transmitted, and at the receiver are used to simulate the input speech (e.g., vocoder systems). Systems of this category are characterized by processing the speech spectral function. The apparatus tends to be very complex as is to be expected where speech analyzers and synthesizers are involved. Parametric systems therefore tend to be prohibitively expensive and also tend to be susceptible to noise.

In systems using compression by limiting, portions of the speech having a minimum effect on quality and intelligibility are discarded by reducing dynamic range or by rejecting certain portions of the speech band. Systems of this category are characterized by the processing of the speech time function. Efforts in this area have received less attention than in the parametric compression area because of the difficulty of relating time function characteristics to particular speech events. Because of poor speech quality this technique has not been acceptable for general communications. However, limiting systems tend to be much less complex than parametric systems and are less susceptible to noise. It would, therefore, be advantageous to use limiting techniques, if speech quality could be improved.

One variation on pure clipping or limiting as discussed above is the introduction of a constant frequency tone outside the frequency spectrum of the speech signal into the speech signal to be clipped. This has been done to reduce background noise by swamping out the noise with the constant frequency signal. However, if the constant frequency signal is increased in power so that its amplitude is comparable to or greater than the amplitude of the speech signal, the output of the clipper is a duty-cycle modulated signal. In effect, the speech signal modulates the on/off cycle of the clipped frequency tone. This modulated signal may be demodulated simply by passing it through a low pass filter to separate out the speech spectrum. The disadvantage of such a system in communications is that most of the transmitted power is in the frequency tone rather than in the speech signal.

Accordingly it is a paramount object of this invention to transmit and receive information-bearing waves, such as speech waves, wherein most of the transmission power is in the information-bearing or speech wave and such transmission has its band width reduced and is less vulnerable to noise and interference.

It is a further object to code the original power levels of the information-bearing waves into a clipped signal wherein most of the power in the clipped signal is contributed by the frequency spectrum of the information-bearing wave.

It is also an object of the invention to decode the power levels of an information-bearing wave from a clipped signal wherein most of the power in the clipped signal is contributed by the frequency spectrum of the information-bearing wave.

In another prior art system of the limiting type the wave is split up into a phase or frequency factor and an amplitude or envelope factor. The two factors are transmitted in separate parallel paths. In one of the paths a clipper derives a sequence of flat top pulses of varying durations and of alternately opposite polarities (a clipped signal). In the other path a rectifier preserves the amplitude information of the original wave, discarding its phase and frequency information. At the receiver station the phase signal is regenerated by applying it to control the switching of a trigger device. The envelope signal is recovered and used to modulate the amplitude of the output of the trigger to thereby produce an approximate replica of the original speech wave. The output of this modulation is still, however, a wave each of whose parts is a rectangle having sharp corners. These sharp corners produce distortion products originally acquired in the course of the clipping process and they cause the reproduced speech to have an unpleasant sound. Further apparatus is then needed for improving the quality of the reproduced speech by passing the clipped signal through a series of filters which smooth the speech signal. As seen by the foregoing, existing systems for coding speech waves are very complex.

The major problem is that prior limiting systems have not been able to relate particular speech events of amplitude and frequency to a pure time function. Hence, the necessity to transmit the envelope signal in a separate path, as in the prior art example above.

Accordingly, it is another object of this invention to provide means for transmitting information-bearing waves by means of a bipolar waveform, where a bipolar waveform is defined as a two level waveform having a zero-axis crossing between each level. The zero-axis crossings of said bipolar waveform relate particular speech events of amplitude and frequency to a pure time function.

Briefly, the above objects are accomplished by combining a constant amplitude reference or control signal with an input signal and transmitting the clipped combination. The reference signal has an amplitude comparable to or less than the input signal and is of a frequency which does not interfere with the frequency band of the input signal. At the receiver the reference signal may be separated from the transmitted clipped combination and the volume of the received signal varied in accordance with variations in the recovered reference signal, thereby maintaining the received signal at its proper level.

The invention has the advantage that it requires only a single channel; a relatively narrow frequency band; and simple, economical coding and decoding equipment. Since the transmitted signal is in the form of a pulse train with both amplitude and frequency coded therein, it is inherently immune to noise.

The invention also permits linear processing of signals through nonlinear devices. For example, there are problems in single-sideband communications which may be obviated by using the invention. These problems are the expense of and dynamic range limitations in linear amplification; peak power limitations; and receiver frequency control. Using the invention, one obtains a constant peak amplitude signal where all the information is in the zero-axis crossing points. This signal can be amplified with a highly efficient, noncritical, class C, nonlinear amplifier. The envelope may be decoded after transmission, allowing the transmitter to be driven at constant peak power thereby increasing the signal to noise ratio at the receiver. Prior systems are handicapped by peak-power limitations of the transmitter because in the prior art the envelope must be restored before transmission. It is also necessary in the prior art to amplitude modulate a very high power signal.

The invention also has advantages when applied to digital communications. If a speech waveform is to be transmitted, the invention provides that only signal polarity need be transmitted as a bipolar waveform, a pulse train of data bits. The data bits need not be grouped into words or bit patterns for decoding as is the case in amplitude quantization systems.

The invention also has advantages when applied to data storage media, because the recording of both amplitude and phase may be accomplished by the invention without regard to the nonlinearity of the recording media.

The foregoing and other objects, features, and advantages of the invention will be apparent from the following more particular description of preferred embodiments of the invention, as illustrated in the accompanying drawings.

In the drawings:

FIG. 1 is a block schematic diagram of a communication system in which the invention is embodied.

FIG. 2 is a block schematic diagram of an envelope decoder and restorer which may be used in conjunction with the communication system of FIG. 1.

FIG. 3 is a block schematic diagram of another envelope decoder and restorer which may be used in conjunction with the communications system of FIG. 1.

FIG. 4 is a block schematic diagram of an envelope decoder and restorer which has a stabilizing feedback loop.

FIGS. *5a*, *5b*, and *5c* are a series of graphs showing the relative power distribution with frequency of the apparatus of FIGS. 1–4.

Figure 6:
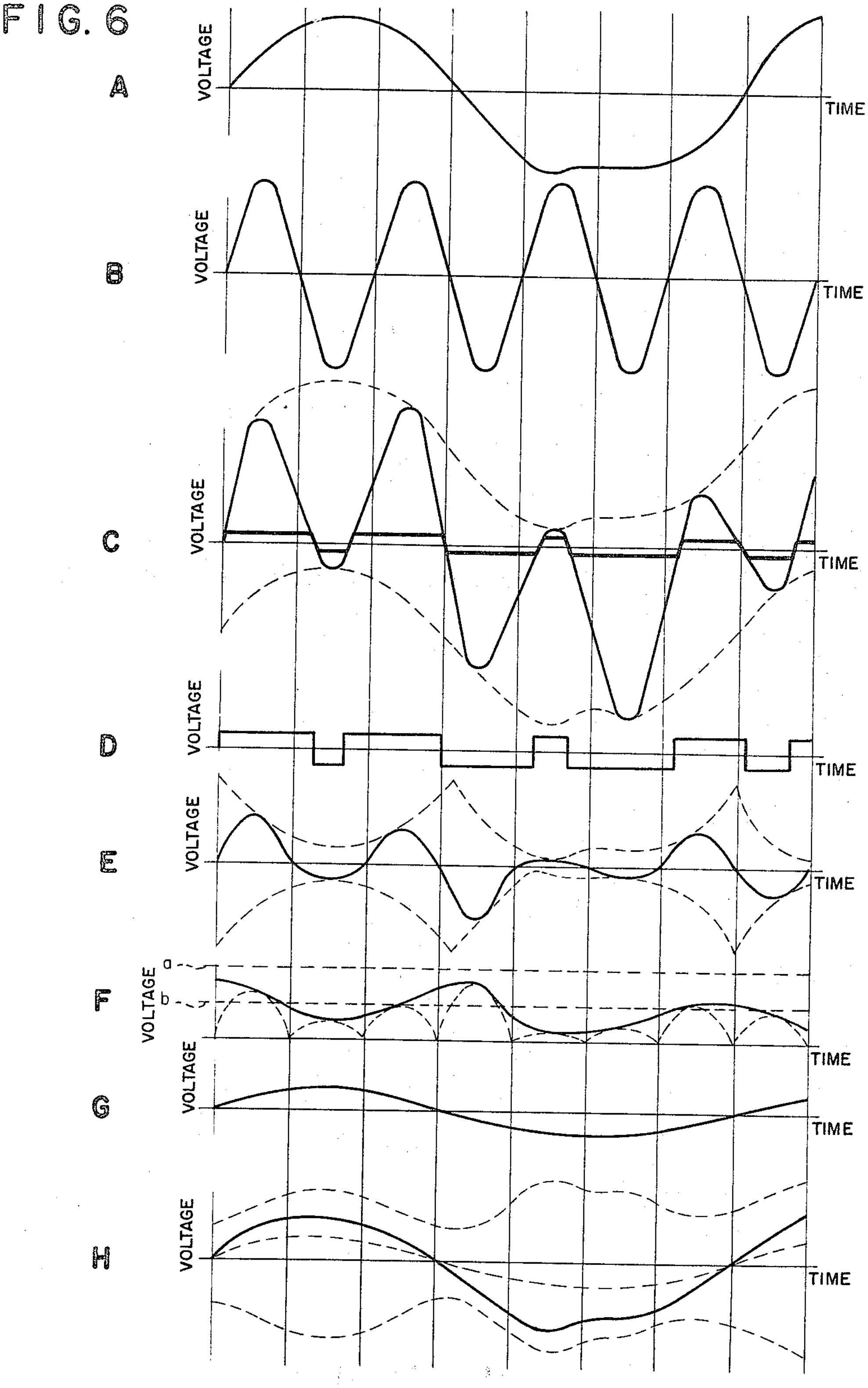

FIG. 6 is a graphical representation of voltage versus time for wave shapes A through H which illustrate the operation of the invention.

Figure 7:
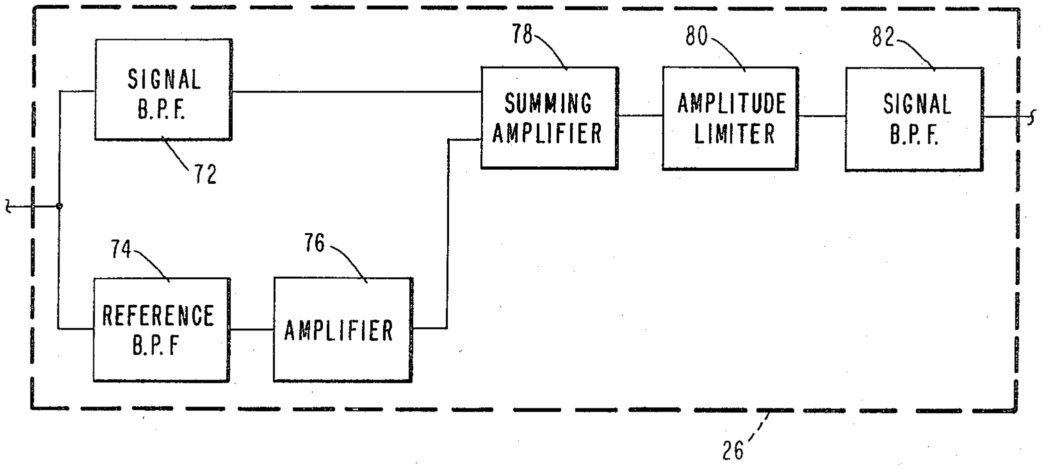

FIG. 7 is a block schematic diagram of an envelope decoder and restorer which uses the encoding technique of the communication system in FIG. 1.

FIGS. *8a*, *8b*, *8c* and *8d* are a series of graphs showing the relative power distribution with frequency of the apparatus of FIG. 7.

Many studies have shown that for a wide class of signals, the relative distribution of power among the various frequency components and the relative phases at each frequency component are closely preserved after the signal is clipped. If the band of interest is restricted so that the upper cut-off frequency of the input signal is less than three times the low cut-off frequency, the relative power distribution is very closely preserved. However, although the relative power distribution is retained, absolute variations are lost, because by the very nature of the clipping process total power in the clipped signal is always maintained equal to some constant.

Therefore, two characteristics of clipped signals may be summarized. First, the total power in a clipped signal remains constant regardless of the power level variations of the original unclipped signal. Second, the relative distribution of the power among the various frequency components of the unclipped signal is closely preserved in the clipped signal. These two characteristics are utilized to accomplish the objects of this invention.

In accordance with the invention, a reference signal, for example, a sine wave which occupies a frequency range which does not interfere with the frequency spectrum of the speech signal, is combined with the speech signal. The combined signal is then clipped and the clipped sum is transmitted to a receiver. FIGS. *5a*, *b*, and *c* illustrate the power versus frequency distribution of the clipped sum signal. FIGS. *5a*, *b*, and *c* are only approximations of the power curves and are not intended to be exact replicas thereof. The "*m*" portion of the curves illustrates the power contribution of the speech signal, which is limited to the frequency band *f1* to *f2*. The "*n*" portion of the curves illustrates the power contribution of the reference signal having a frequency *f3*. The total power in the clipped sum signal is equal to the sum of the areas under the curves "*m*" and "*n*" in FIGS. *5a*, *b*, and *c*, which must always equal a constant.

Further, the relative distribution of power over the frequency band *f1* to *f2* (represented by the curve "*m*") of the clipped signal follows the relative distribution of power of the unclipped signal. Now, since the absolute power of the clipped signal must always equal some constant, the power contribution of the speech signal (the area under curve *m* FIG. *5a*) plus the power contribution of the reference signal (the area under the curve *n* FIG. *5a*) must combine to always equal that constant. If, as in FIG. *5b*, the power level of the speech increases, its contribution to the power of the clipped signal (the area under curve $m'$) will increase. Therefore, the power contribution of the reference signal (the area under curve $n'$) must decrease by a proportional amount, so that the sum of the power contribution of the speech signal (the area under curve $m'$) and the power contribution of the reference signal (the area under curve $n'$) will equal the constant. If, as in FIG. *5c*, the power contribution of the speech signal (area under $m''$) decreases, perhaps to zero, then the power contribution of the reference signal (area under $n''$) must increase and will be a maximum whenever the power contribution of the speech signal reduces to zero.

The original variations of power level in the speech signal are recovered by separating the speech signal and the reference signal from the clipped combination. The power level of the recovered reference signal will vary in inverse proportion to the power level of the original unclipped speech signal. Therefore, by varying the level of the recovered speech signal inversely with the power level of the recovered reference signal, the original power level variations can be reinserted at the receiver.

A communication system embodying the invention is shown in FIG. 1. A suitable transducer 10, adapted to convert speech signals into electrical signals, is followed by a pre-emphasis circuit 12. The output of the pre-emphasis circuit 12 feeds the input of a band-pass filter 14 the output of which feeds one input of a summing amplifier 18. The other input of the summing amplifier 18 is fed by a reference-signal generator 16, which may be adapted to generate a sinusoidal wave of constant amplitude. The output of the summing amplifier 18 feeds processing means 20 which is followed by an amplitude limiter 22. The output of the amplitude limiter 22 is then subjected to processing or transmission represented by block 24. The output of block 24 drives an envelope decoder and restorer 26, the output of which is subjected to de-emphasis by circuit 28. The output of the de-emphasis circuit 28 drives a suitable transducer 30 which transforms electrical signals into audible signals.

The operation of the circuit of FIG. 1 will be described with reference to the waveforms of FIG. 6. The waveforms of FIG. 6 are simplifications of the actual waveforms, for purposes of illustration only. A complex speech signal is introduced in audible form to the transducer 10 which converts the signal to an electrical signal. A pre-emphasis circuit 12 may be used to amplify higher frequencies in order to insure that the higher frequencies cross the zero axis. A band-pass filter 14 may be used to remove any unwanted high frequency components, for example, noise outside of the useful information band. The voltage output of band-pass filter 14 is represented on the time scale in graph A of FIG. 6. The output of the reference-signal generator 16 is represented in graph B of FIG. 6. The output of band-pass filter 14 and reference-signal generator 16 are added together by summing amplifier 18, the output of which is represented by the thin solid line of graph C. The output of summing amplifier 18 may or may not be subjected to further processing as illustrated by processing means 20. The output of block 20 is then amplitude limited by an amplitude limiter 22. The function of the amplitude limiter is to derive from the sum signal a clipped or amplitude limited wave in which each zero crossing of the sum signal is accurately preserved, while each excursion, positive or negative, is replaced by a rectangular wave portion of a fixed amplitude. The result of this clipping process is shown by graph D of FIG. 6. To produce as nearly as possible a rectangular wave, it may be necessary to repeat the clipping operation many times with amplification between each individual clipping operation and the next. Otherwise, the clipped signal would have the appearance of the heavy line of graph C where the clipped wave is shown as following the sum signal (the light solid line) throughout a brief course including each zero crossing, and throughout this course having a finite slope. The clipped signal is then subjected to processing or is transmitted to a receiver station by any technique desired depending upon the medium through which it is desired to transmit the signal. In this regard the processing or transmission means 24 need be designed with a view to preserving only the abrupt transitions of the wave of graph D, and it is not necessary to transmit large amplitudes. After processing or transmission the original wave is reconstructed in the envelope decoder and restorer 26 resulting in wave shape H. A de-emphasis circuit 28 must be provided, if a pre-emphasis circuit 12 is provided at the input, in order to reproduce the original wave shape as it appeared before pre-emphasis. The output of the de-emphasis circuit 28 may then be used to control a suitable transducer 30 which converts the electrical signal to an audible signal.

Clipping introduces modulation products which may cause distortion in the speech, and these products may lie within the frequency band of the speech. It may, therefore, be desirable to first shift the speech up on the frequency scale, and apply the clipping to the frequency shifted wave. The wave may then be shifted down in frequency back to the original frequency spectrum by a heterodyne detector.

A close examination of curve D of FIG. 6 serves to illustrate how the power variations of the original wave shape of graph A are coded by the addition of the reference signal shown in graph B. At this point, however, it should be made clear that the reference signal has been chosen of an amplitude comparable to that of the speech signal only for purposes of a clearer illustration of how the power levels are coded. The system will operate equally well when the reference signal is small relative to the speech signal and in fact this situation is preferable from a viewpoint of power efficiency. This can be shown to be true as follows. Consider FIGURE 5*a*. The total spectrum shown is the fourier transform of the autocorrelation function $\rho(\tau)$ of the sum of the signal and reference tone. That is $$\rho(\tau)=\rho_s(\tau)+\rho_r(\tau) \qquad (1)$$

where $\rho_s(\tau)$ and $\rho_r(\tau)$ are the autocorrelation functions of the input signal and reference signal respectively. For a broad class of signals, it can be shown that the autocorrelation function of a clipped waveform $\hat{\rho}(\tau)$ is given by $$\hat{\rho}(\tau)=\frac{2}{\pi}\sin^{-1}\frac{\rho(\tau)}{\rho(0)} \qquad (2)$$

where $\rho(0)$ is the power or mean square amplitude of the unclipped waveform. For large values of $\tau$, the ratio $\rho(\tau)/\rho(0)$ approaches zero. Therefore, using the series expansion of the inverse sine, $$\hat{\rho}(\tau)=\frac{2}{\pi}\left[\frac{\rho(\tau)}{\rho(0)}+\frac{1}{6}\left(\frac{\rho(\tau)}{\rho(0)}\right)^3+\dots\right] \qquad (3)$$

Therefore, to a fair approximation, the autocorrelation function of the clipped waveform is $$\hat{\rho}(\tau)\approx\frac{2}{\pi}\frac{\rho(\tau)}{\rho(0)}=\frac{2}{\pi}\frac{\rho_s(\tau)}{\rho_s(0)+\rho_r(0)}+\frac{2}{\pi}\frac{\rho_r(\tau)}{\rho_s(0)+\rho_r(0)} \qquad (4)$$

The areas under the curves $m'$ and $m''$ in FIGURES 5*b* and 5*c* are $$A_m=\frac{2}{\pi}\frac{\rho_s(0)}{\rho_s(0)+\rho_r(0)} \qquad (5)$$

Likewise the area under the curves $n'$ and $n''$ are $$A_n=\frac{2}{\pi}\frac{\rho_r(0)}{\rho_s(0)+\rho_r(0)} \qquad (6)$$

The mean square amplitude of the reference signal $\rho_r(0)$ is constant. Consequently if $\rho_s(0)$ increases or decreases, the relative areas will vary as shown in FIGURES 5*b* and 5*c*.

To recover the power level of the original input signal it is necessary to divide the RMS intensity of the recovered input signal by the RMS intensity of the recovered reference signal. This is accomplished in various ways by the detectors shown in FIGURES 2, 3, and 4. If this division is performed the autocorrelation of the recovered signal is $$\frac{\frac{2}{\pi}\left[\frac{\rho_s(\tau)}{\rho_s(0)+\rho_r(0)}\right]}{\frac{2}{\pi}\left[\frac{\rho_r(0)}{\rho_s(0)+\rho_r(0)}\right]}=\frac{\rho_s(\tau)}{\rho_r(0)} \qquad (7)$$

Because the original intensity of the reference tone $\rho_r(0)$ is constant, the recovered signal has the same intensity as the original signal but scaled by a constant.

The above argument is independent of the relative amplitude of the input signal and the reference signal and it is precise except for the approximation $x=\sin^{-1} x$. A more detailed analysis and preliminary experimental studies show that the effect of the inverse sine approximation is to shift part of the signal power to the reference band and vice versa. This means there are practical limitations on how small the reference amplitude may be and how close the reference frequency can be to the signal spectrum. It has been predicted and verified experimentally that if the peak spectral density of the reference tone is greater than the peak spectral density of the signal; and if the separation of the reference and signal spectrum is about 100 cps., then satisfactory operation is obtained with speech. This situation is illustrated in FIGURES 5*a* and 5*c*. However, the area (i.e., total amplitude) of the signal spectrum can be considerably greater than the area (i.e., total amplitude) of the reference signal.

The envelope decoder and restorer 26 shown in FIG. 1 may take on a variety of forms. One such form is shown in FIG. 2. In FIG. 2, the envelope decoder and restorer is comprised of a signal band-pass filter 34 which passes only the frequency band of the original speech signal. The output of the signal band-pass filter 34 feeds the dividend input of a divider circuit 38. The clipped sum signal is also passed through a reference band-pass filter 32 which passes only the frequency band of the reference signal. The reference band-pass filter is followed by an envelope detector 36 which may, for example, be comprised of a full wave rectifier followed by a low-pass filter. The output of the envelope detector is fed to the divisor input of the divider circuit 38. The output of the divider circuit 38 corresponds to the output of envelope decoder and restorer 26 of FIG. 1.

The operation of FIG. 2 is as follows. The clipped sum signal is received at the input of the envelope decoder and restorer 26. The sum signal is fed to signal band-pass filter 34 which passes only the frequency band of the original speech signal. The output of signal band-pass filter 34 is represented in graph G of FIG. 6. The clipped sum signal is also fed to reference band-pass filter 32 which passes only the frequency band of the reference signal. The output will have a wave shape approximating the wave shape illustrated by the solid line in graph E of FIG. 6. The output of the reference band-pass filter is fed through the envelope detector 36, the output of which is shown by the solid curve of graph F. The output of envelope detector 36 varies inversely proportional to the envelope of the original speech signal shown in graph A. The result of dividing the curve G by the curve F in the divider circuit 38 is approximated by the solid line of graph H. The resulting signal has the same shape as the original speech signal shown in graph A.

The envelope decoder and restorer 26 of FIG. 1 may be of the type shown in FIG. 3. In FIG. 3, the output of processing or transmission means 24 of FIG. 1 illustrated by the wave shape of graph D, FIG. 6, is fed to a signal band-pass filter 40 and a reference band-pass filter 44. The output of signal band-pass filter 40 is fed to the input of variable gain amplifier 42. The output of variable gain amplifier coincides with the output of envelope decoder and restorer 26 of FIG. 1 which is fed to the de-emphasis circuit 28. The output of reference band-pass filter 44 is fed to envelope detector 46, which may be of the same type as envelope detector 36 of FIG. 2. The output of the envelope detector feeds one input of a difference amplifier 50. The other input of difference amplifier 50 is fed by comparison-signal generator 48. The output of the difference amplifier drives the gain control input of variable gain amplifier 42.

The operation of the envelope decoder and restorer shown in FIG. 3 is as follows. The transmitted train of pulses illustrated by graph D are passed through a signal band-pass filter 40 which passes only the frequency band of the original unclipped speech signal. The output of this band-pass filter is amplified by variable gain amplifier 42. The train of pulses of graph D also is fed to a reference band-pass filter 44 which passes only the frequency band of the original unclipped reference signal. The output of this band-pass filter is approximated by the solid curve of graph E. This signal is fed to envelope detector 46, the output of which is illustrated by the solid line of graph F. The difference amplifier 50 amplifies only the difference between the output of comparison-signal generator 48 (which may be, for example, a DC voltage represented by the dotted line *a* of graph F) and the detected envelope represented by the solid line of graph F. The gain of the variable gain amplifier 42 will therefore be caused to increase and decrease in proportion to the detected envelope as illustrated by the uppermost and lowermost dotted curves shown in graph H. Accordingly, as the detected envelope of graph F increases in amplitude, the gain of variable gain amplifier 42 is reduced. If the envelope of graph F decreases in amplitude, the gain of variable gain amplifier 42 will be increased under the control of difference amplifier 50. Therefore, the output of variable gain amplifier 42 will very closely follow the original unclipped speech wave shape.

A form of the envelope decoder and restorer 26 of FIG. 1, employing a stabilizing feedback loop, is shown in FIG. 4. The output of the processing or transmission means 24 shown in FIG. 1 is fed to the input of variable gain amplifier 52. The output of variable gain amplifier is fed to a signal band-pass filter 62 and a reference band-pass filter 54. The output of signal band-pass filter 62 directly feeds the de-emphasis circuit 28 of FIG. 1. The output of reference band-pass filter 62 is fed to an envelope detector 56 which may be of the type employed in the circuits of FIG. 2 and FIG. 3. The output of envelope detector 56 is fed to one input of difference amplifier 60. The other input of difference amplifier 60 is fed by the output of a comparison-signal generator 58. The output of difference amplifier 60 drives the gain control input of variable gain amplifier 52.

The operation of envelope decoder and restorer of FIG. 4 is as follows. The pulse train, shown by the curve of graph D in FIG. 6, is amplified by variable gain amplifier 52. Signal band-pass filter 62 passes only the frequency band of the original speech signal and therefore separates the speech sepctrum only from the output of variable gain amplifier 52. The reference band-pass filter 54 passes only the frequency band of the reference signal and therefore separates the reference signal from the output of variable gain amplifier 52. The envelope of the separated reference signal is detected by the envelope detector 56 which follows the reference band-pass filter 54. The output of difference amplifier 60 is the difference between the amplitude of the envelope and a voltage (which may be represented by the doted line *b* of graph F) generated by comparison signal generator 58. The output of difference amplifier 60 forces the gain of variable gain amplifier in such a direction that it always tends to reduce the difference between the envelope and the comparison signal to zero. For example, if in graph F the envelope (represented by the solid line) is above the curve *b* (which represents the comparison signal) the output of difference amplifier 60 will reduce the gain of variable gain amplifier 52. The amplitude of the separated reference signal from reference band-pass filter 54 will be reduced in amplitude and likewise the envelope of that wave from envelope detector 56 will be reduced in amplitude thus reducing the difference between the envelope and the comparison signal to zero. Similarly, if the envelope voltage goes below the comparison signal the output of difference amplifier 60 will increase the gain of variable-gain amplifier. This increases the amplitude of the envelope to thereby reduce the difference between the envelope and the comparison signal to zero. Since the output of variable-gain amplifier 52 affects both the separated speech signal and the reference signal, the recovered speech signal will be varied in accordance with changes in the envelope of the reference signal.

Another form of the envelope decoder and restorer 26 of FIG. 1, employing in the decoder the same technique used in encoding in FIG. 1, is shown in FIG. 7. The output of the processing or transmission means 24 shown in FIG. 1 is fed to the input of the signal band-pass filter 72 and the reference band-pass filter 74. The output from the signal band-pass filter 72 is fed to summing amplifier 78. Meanwhile, the output of the reference band-pass filter 74 is amplified by amplifier 76 and also passed to the summing amplifier 78. The sum signal created in the receiver by summing amplifier 78 is then clipped by amplitude limiter 80. Signal band-pass filter 82 responds to the output of the amplitude limiter 80 to separate the original speech signal from the clipped receiver sum signal.

In operation, the signal band-pass filter 72 separates from the received train of pulses the constant power level speech signal. Simultaneously, the reference band-pass filter 74 separates from the received train of pulses the reference signal. The separated reference signal is then amplified by amplifier 76 so that its power level is greater than that of the separated speech signal. Summing amplifier 78 adds the separated speech signal and the amplified separated reference signal to form a receiver sum signal. This receiver sum signal is clipped by amplitude limiter 80. The effect of this summing clipping operation is to vary the power level in the speech spectrum inversely with respect to the power level in the amplified reference signal. Since the reference signal is varying inversely with the power level of the original speech signal, the speech spectrum out of amplitude limiter 80 is now varying directly with the power level of the original speech signal. Signal band-pass filter 82 then separates out the speech spectrum from the clipped receiver sum signal and thus reproduces the original speech signal.

The theory of operation for the decoder restorer in FIG. 7 is identical to the encoding technique used in FIG. 1 as discussed with reference to FIGS. *5a*, *5b* and *5c*. The difference between the encoding operation and the decoding operation is that the role of the speech spectrum and the role of the reference frequency signal have been interchanged. In FIG. 1, during the encoding, the reference signal had a constant power level whereas the speech signal was greater in amplitude and varied in power level. In the decoding operation of FIG. 7, the separated speech signal has a constant power level while the amplified separated reference signal varies in power level and is greater in amplitude than the separated speech signal. In the foregoing forms of envelope decoder and restorer 26, it is well known in the art that the signal band-pass filter and the reference band-pass filter should have substantially equal insertion losses so as not to alter the ratio of signal power to reference power. Such filters of substantially equal insertion loss are easily achieved in practice.

Figure 8A:
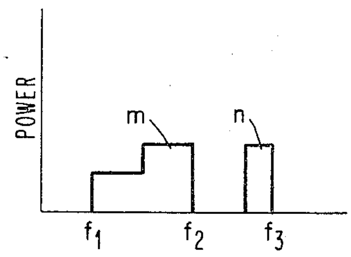
Figure 8B:
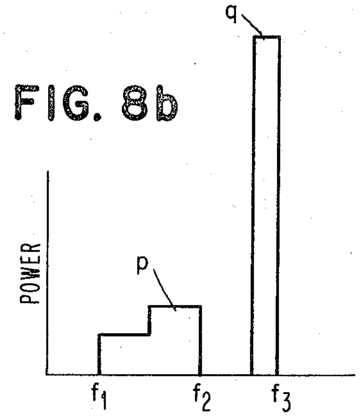
Figure 8C:
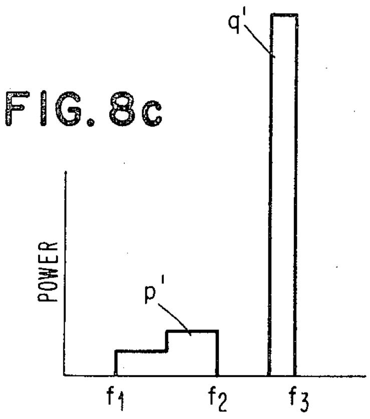
Figure 8D:
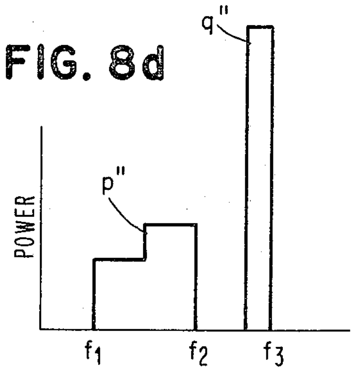

Referring now to FIGS. 8*a* through 8*d*, the theory behind the decoding operation will be set forth. In FIG. 8*a*, the power spectrum of the signal received by the band-pass filters 72 and 74 is shown. FIGS. 8*b* through 8*d* show the power spectrum of the clipped receiver sum signal derived from the amplitude limiter 80. The decoder, consisting of the summing amplifier 78 and the amplitude limiter 80 makes use of the two characteristics of clipped signals previously summarized. First, the total power in a clipped signal remains constant regardless of the power level variations of the original unclipped signal. Second, the relative distribution of the power among the various frequency components of the unclipped signal is closely preserved in the clipped signal. Thus FIG. 8*b* shows a normal condition where the power level of the speech spectrum *p* and the power level of the reference spectrum *q* are shown at median levels. In FIG. 8*c* the power level of the reference spectrum *q'* has increased and therefore the power level in the speech spectrum *p'* is considerably reduced. In FIG. 8*d* the power level of the reference spectrum *q''* has been reduced and accordingly the power level in the speech spectrum *p''* is considerably increased. From this it can be seen that the speech power spectrum out of amplitude limiter 78 varies inversely with respect to the reference power spectrum. Since the reference power spectrum is varying inversely with the original power level of the speech spectrum, the speech power spectrum out of the amplitude limiter 78 is now varying directly with the original power levels of the speech spectrum. Thus the signal band-pass filter 80 which selects out the speech spectrum reproduces the original speech signal both as to frequency and amplitude.

In summary, in accordance with the invention, the power level of a speech or other complex wave shape may be coded into a train of pulses by adding a constant amplitude reference or control signal to the complex wave shape. The power variations in the complex wave shape frequency spectrum cause inverse power variations in the reference signal frequency spectrum. The sum signal is then clipped or limited. In accordance with the characteristics of limited or clipped signal processing, absolute power variations are lost, but the relative power distribution between the speech signal and the reference signal are preserved. Therefore, by separating the reference signal from the speech signal the ratio between the recovered speech signal power and the recovered reference signal power will be equal to the ratio between the original unclipped speech power and the original unclipped reference signal power. Since the power of the original reference signal is known, the power of the recovered speech signal may be determined by comparing the recovered reference signal power with the known reference signal power and controlling the magnitude of the power of the recovered speech signal accordingly.

While the invention has been particularly shown and described with reference to preferred embodiments thereof, it will be understood by those skilled in the art that various changes in form and details may be made therein without departing from the spirit and scope of the invention.

What is claimed is:

1. Apparatus for transmitting a complex wave, said wave characterized by variations in amplitude and time-varying zero-axis crossings comprising:
   - means for adding a constant amplitude reference signal having an amplitude greater than that of the complex wave and having a frequency which is greater than the highest significant frequency component in, and outside the frequency band of, the complex wave, to the complex wave, to thereby produce a sum signal;
   - means for converting said sum signal to a bipolar waveform of constant amplitude, said bipolar waveform having zero-axis crossings corresponding to the zero-axis crossings of the sum signal;
   - means for transmitting said bipolar waveform;
   - separating means in a receiver responsive to said transmitting means for separating from said series of pulses the frequency band of the reference signal and the frequency band of the complex wave to produce respectively a separated reference signal and a separated complex wave; and
   - regulating means in the receiver for regulating the level of the separated complex wave in response to the level of the separated reference signal.

2. The combination according to claim 1 wherein said regulating means comprises:
   - deriving means responsive to said separating means for deriving the envelope of the separated reference signal; and
   - divider means responsive to said separating means and said deriving means for dividing the separated complex wave by the envelope of the separated reference signal.

3. The combination according to claim 1 wherein said regulating means comprises:
   - variable-gain amplifier means for amplifying the separated complex wave, said variable-gain amplifier means having control means for increasing or decreasing the gain of said amplifier means;
   - detecting means for detecting the envelope of the separated reference signal;
   - means for generating a comparison signal;
   - deriving means for deriving the difference between the envelope and the comparison signal; and
   - said control means of said variable-gain amplifier means responsive to said deriving means for controlling the gain of said amplifier means in proportion to the difference between the envelope and the comparison signal so that the original complex wave is reproduced from the separated complex wave.

4. The combination according to claim 1 wherein said regulating means comprises:
   - variable-gain amplifier means in the receiver preceding said separating means for amplifying said bipolar waveform, said variable-gain amplifier means having control means for varying the gain of said amplifier;
   - detecting means responsive to said separating means for detecting the envelope of the reference signal separated from the amplifier bipolar waveform;
   - means for generating a comparison signal;
   - deriving means for deriving the difference between the envelope and said comparison signal;
   - said control means of said variable gain amplifier means responsive to said deriving means for varying the gain of said amplifier means to reduce the difference between the envelope and the comparison signal to zero, so that said separating means will separate out the original complex wave from the amplified bipolar waveform.

5. The combination according to claim 1 wherein said regulating means comprises:

amplifying means for amplifying the separated reference signal so that the amplified separated reference signal is greater than the separated complex wave;

modulating means for modulating the amplified, separated reference signal with the separated complex wave to produce a modulated signal containing in the frequency band of the complex wave the original complex wave; and means for separating from the modulated signal the frequency band of the complex wave so that the original complex wave is reproduced.

6. The combination according to claim 5 wherein said modulating means comprises:

combining means for combining the separated complex wave and the separated, amplified reference signal to produce a superposition of the two signals; and converting means responsive to said combining means for converting the superposition of signals to a receiver bipolar waveform having the same zero-axis crossings as the superposition of signals, said receiver bipolar waveform constituting the modulated signal.

7. The method of transmitting a complex wave, said wave characterized by variations in amplitude and time varying zero-axis crossings, comprising the steps of:

(a) adding to the complex wave a control signal of known amplitude greater than that of the complex wave and of a frequency greater than the highest significant frequency component in the complex wave, to thereby produce a sum signal;

(b) converting the sum signal to a bipolar waveform of constant amplitude having zero-axis crossings corresponding to the zero-axis crossings of the sum signal;

(c) conveying the bipolar waveform to a receiver station;

(d) separating from the sum signal the control signal frequency and the complex wave frequencies at said receiver station; and, (e) regulating the level of the separated complex wave in accordance with amplitude variations in the separated control signal.

8. The method of transmitting a complex wave, said wave characterized by variations in amplitude and time varying zero-axis crossings, comprising the steps of:

(a) adding to the complex wave a control signal of known power level greater than that of the complex wave and of a frequency greater than the highest significant frequency component in the complex wave, to thereby produce a sum signal;

(b) converting the sum signal to a rectangular wave wherein the relative distribution of power with frequency closely resembles the relative distribution of power with frequency of the sum signal so that the power contribution of said control signal varies inversely with the power contribution of said complex signal;

(c) conveying the rectangular wave to a receiver station;

(d) filtering the frequency band of the control signal at said receiver station to thereby produce a filtered control signal;

(e) filtering the frequency band of the complex wave at said receiver station to thereby produce a filtered complex wave; and, (f) varying the power level of the filtered complex wave in inverse proportion to the power level of the filtered control signal.

9. Apparatus for coding and recovering the absolute power variations of a complex wave comprising:

summing means for adding a control signal of known constant power level and frequency to the complex wave, to thereby produce a sum signal;

converting means for converting said sum signal to a rectangular wave having a constant power and wherein the relative distribution of power with frequency closely resembles the relative distribution of power with frequency of the sum signal so that the power contribution of the control signal varies inversely with the power contribution of the complex signal;

separating means for separating from the rectangular wave the complex wave frequency band and the control signal frequency band so that the complex wave and the control signal are recovered from the rectangular wave;

varying means for varying the power level of the recovered complex wave inversely to the variations of the power level of the recovered control signal so that the original complex wave is reproduced.

10. The apparatus of claim 9, wherein said varying means includes:

amplifying means responsive to said separating means for amplifying the recovered control signal, wherein the power contribution of said control signal varies inversely with power contribution of the original complex wave, so that the power in the amplified recovered control signal is greater than the power in the recovered complex wave;

summing means for adding the recovered complex wave of constant power level to the amplified recovered control signal to thereby produce a receiver sum signal;

means for converting said receiver sum signal to a receiver rectangular wave wherein the relative distribution of power with frequency closely resembles the relative distribution of power with frequency of the recovered sum signal so that the power contribution of the complex wave varies directly with the power contribution of the original complex wave;

means for filtering from the receiver rectangular wave the frequency band of the complex wave so that the original complex wave is reproduced.

References Cited

UNITED STATES PATENTS 3,167,720 1/1965 Sharma ---------- 332—15 X

JOHN W. CALDWELL, *Primary Examiner.*

J. T. STRATMAN, *Assistant Examiner.*